(12) United States Patent
Chang et al.

(10) Patent No.: US 8,917,366 B2
(45) Date of Patent: Dec. 23, 2014

(54) LIQUID CRYSTAL DISPLAY DEVICE

(75) Inventors: Kuangyao Chang, Shenzhen (CN);
Zanjia Su, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 217 days.

(21) Appl. No.: 13/515,808

(22) PCT Filed: Apr. 12, 2012

(86) PCT No.: PCT/CN2012/073880
§ 371 (c)(1),
(2), (4) Date: Jun. 13, 2012

(87) PCT Pub. No.: WO2013/149410
PCT Pub. Date: Oct. 10, 2013

(65) Prior Publication Data
US 2013/0258227 A1    Oct. 3, 2013

(30) Foreign Application Priority Data

Apr. 1, 2012 (CN) .......................... 2012 1 0096096

(51) Int. Cl.
*G02F 1/1335* (2006.01)
*F21V 7/04* (2006.01)

(52) U.S. Cl.
USPC ................... 349/57; 349/61; 349/62; 349/64; 362/97.1; 362/97.2; 362/620

(58) Field of Classification Search
CPC ............ G02F 1/1335; G02F 1/133504; G02F 1/133606; G02F 1/133608; G02F 2001/133607
USPC ......... 349/57, 61–62, 64; 362/97.1–9.72, 620
See application file for complete search history.

(56) References Cited

U.S. PATENT DOCUMENTS

| | | | |
|---|---|---|---|
| 8,363,181 B2 * | 1/2013 | Nasu et al. | 349/64 |
| 2007/0110386 A1 * | 5/2007 | Chiang | 385/147 |
| 2008/0225201 A1 * | 9/2008 | Hoshi | 349/62 |
| 2010/0208160 A1 * | 8/2010 | Park et al. | 349/58 |
| 2010/0246161 A1 * | 9/2010 | Goto et al. | 362/97.1 |
| 2011/0102477 A1 * | 5/2011 | Nango et al. | 345/690 |

FOREIGN PATENT DOCUMENTS

CN    101271216 A    9/2008

* cited by examiner

*Primary Examiner* — Nathanael R Briggs
(74) *Attorney, Agent, or Firm* — Cheng-Ju Chiang

(57) ABSTRACT

The present invention provides a liquid crystal display device, which includes a backlight module and a liquid crystal panel disposed on the backlight module. The backlight module includes an optic film assembly. The optic film assembly includes a first prism plate. The liquid crystal panel includes a first polarization plate. The first polarization plate is arranged to directly confront the first prism plate. The first prism plate includes a first base plate and a plurality of parallel first prism bars formed on an upper surface of the first base plate. The first prism bars have an axial direction that forms an included angle with respect to a polarization direction of the first polarization plate. The liquid crystal display device omits the topmost diffusion plate that is conventionally used in the known optic film assembly so as to reduce the manufacture cost.

10 Claims, 6 Drawing Sheets

LIQUID CRYSTAL DISPLAY DEVICE

BACKGROUND OF THE INVENTION

1. Field of the Invention

The present invention relates to the field of liquid crystal displaying, and in particular to a liquid crystal display device.

2. The Related Arts

Liquid crystal display (LCD) has a variety of advantages, such as compact device size, low power consumption, and being free of radiation, and is thus widely used. Most of the LCDs that are currently available in the market are backlighting LCDs, which comprise a liquid crystal panel and a backlight module. The working principle of the liquid crystal panel is that liquid crystal molecules are interposed between two parallel glass substrates and a plurality of vertical and horizontal fine electrical wires is arranged between the two glass substrates, whereby the liquid crystal molecules are controlled to change direction by application of electricity in order to refract light emitting from the backlight module for generating images. Since the liquid crystal panel itself does not emit light, light must be provided by the backlight module in order to normally display images. Thus, the backlight module is one of the key components of an LCD. The backlight module can be classified as two types, namely side-edge backlight module and direct backlight module, according to the position where light gets incident. The direct backlight module arranges a light source, such as a cold cathode fluorescent lamp (CCFL) or a light-emitting diode (LED) at the back side of the liquid crystal panel to form a planar light source that directly provides lighting to the liquid crystal panel. The side-edge backlight module arranges a backlight source, such as an LED light bar based light source, at an edge of a back panel that is located rearward of one side of the liquid crystal panel. The LED light bar emits light that enters a light guide plate through a light incident face of the light guide plate and is projected out through a light exit face after being reflected and diffused to thereby form, after transmitting through a set of optic films, a planar light source to be provided to the liquid crystal panel.

Both the direct backlight module and the side-edge backlight module comprise a set of optic films. A liquid crystal panel is set on the backlight module to directly confront the optic films. The optic films that are currently used include a lower diffusion plate, a prism plate that is disposed on the lower diffusion plate, and an upper diffusion plate that is disposed on the prism plate. The lower diffusion plate functions to concentrate light emitting from the light guide plate for uniform projection onto the prism plate, while the upper diffusion plate functions for hazing the light projecting from the prism plate to effect homogeneous emission of light and elimination of side lobe light shape thereby eliminating irregularity of brightness and darkness (being bright at front view angle and side lobe but dark therebetween) for observation made at a given view angle. However, the existence of the upper diffusion plate causes deterioration of gain of luminance to some extents. Experiments show that removing the upper diffusion plate will increase the luminance gain by 10%. An optic film assembly with the upper diffusion plate removed is generally used in small-sized displays that require low optical grades, such as display of notebook computer or display of desktop computer.

For large-sized liquid crystal displays, with the consideration that observation may be made at various view angles, to avoid non-homogeneous brightness, the side lobe must be properly removed. This requires the use of the upper diffusion plate so that homogeneity of brightness can be obtained at the expense of deterioration of luminance gain so that the optical grade of the large-sized liquid crystal display can be improved. This has been the common technical consensus of the industry.

SUMMARY OF THE INVENTION

Thus, an object of the present invention is to provide a liquid crystal display device that omits the topmost diffusion plate of the conventionally used optic film assembly by having a prism plate of the optic film assembly directly confronting a liquid crystal panel in order to ensure proper optical grade of a large-sized liquid crystal display device, while increasing light utilization and reducing manufacture cost.

To achieve the object, the present invention provides a liquid crystal display device, which comprises a backlight module and a liquid crystal panel disposed on the backlight module. The backlight module comprises an optic film assembly. The optic film assembly comprises a first prism plate. The liquid crystal panel comprises a first polarization plate. The first polarization plate is arranged to directly confront the first prism plate. The first prism plate comprises a first base plate and a plurality of parallel first prism bars formed on an upper surface of the first base plate. The first prism bars have an axial direction that forms an included angle with respect to a polarization direction of the first polarization plate.

The included angle between axial direction of the first prism bars and the polarization direction of the first polarization plate is in the range of 50°-90°.

The first base plate of the first prism plate has a lower surface that is subjected to hazing treatment to form a hazed surface.

The hazing treatment is frosting, blasting or screen printing.

The lower surface of the first base plate is so hazed to show 10%-40% haze.

The optic film assembly comprises a diffusion plate disposed below the first prism plate.

The optic film assembly comprises a second prism plate disposed between the first prism plate and the diffusion plate. The second prism plate comprises a second base plate and a plurality of parallel second prism bars formed on an upper surface of the second base plate. The second prism bars have an axial direction perpendicular to the axial direction of the first prism bars.

The first prism bars are triangular prisms, which are gradually tapered in an upward direction from the upper surface of the first base plate whereby the first prism bars have apexes that are each of a sharp corner. The second prism bars are triangular prisms, which are gradually tapered in an upward direction from an upper surface of the second base plate whereby the second prism bars have apexes that are each of a rounded corner.

The liquid crystal panel comprises a first glass substrate disposed on the first polarization plate, a second glass substrate disposed on the first glass substrate, liquid crystal arranged between the first glass substrate and the second glass substrate, and a second polarization plate disposed on the second glass substrate.

The backlight module comprises a backplane, a reflector plate arranged in the backplane, a light guide plate arranged on the reflector plate, a light source arranged inside the backplane, and a mold frame mounted to the backplane. The optic film assembly is disposed on the light guide plate. The liquid crystal panel is disposed on the mold frame.

The efficacy of the present invention is that the present invention provides a liquid crystal display device, which omits the topmost diffusion plate of the known optic film assembly so as to lower the manufacture cost and also arranges the topmost, first prism plate of an optic film assembly and the bottommost first polarization plate of the liquid crystal panel in such a way to show an angle therebetween in order to increase the light transmittance of the liquid crystal display device, improve non-homogeneity of brightness and darkness displayed on the liquid crystal panel and also provides a coating on the surface of the first prism plate that is away from the first polarization plate to show predetermined haze for eliminating side lobe light shape of image and thus improving optical grade of a large-sized liquid crystal display device.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
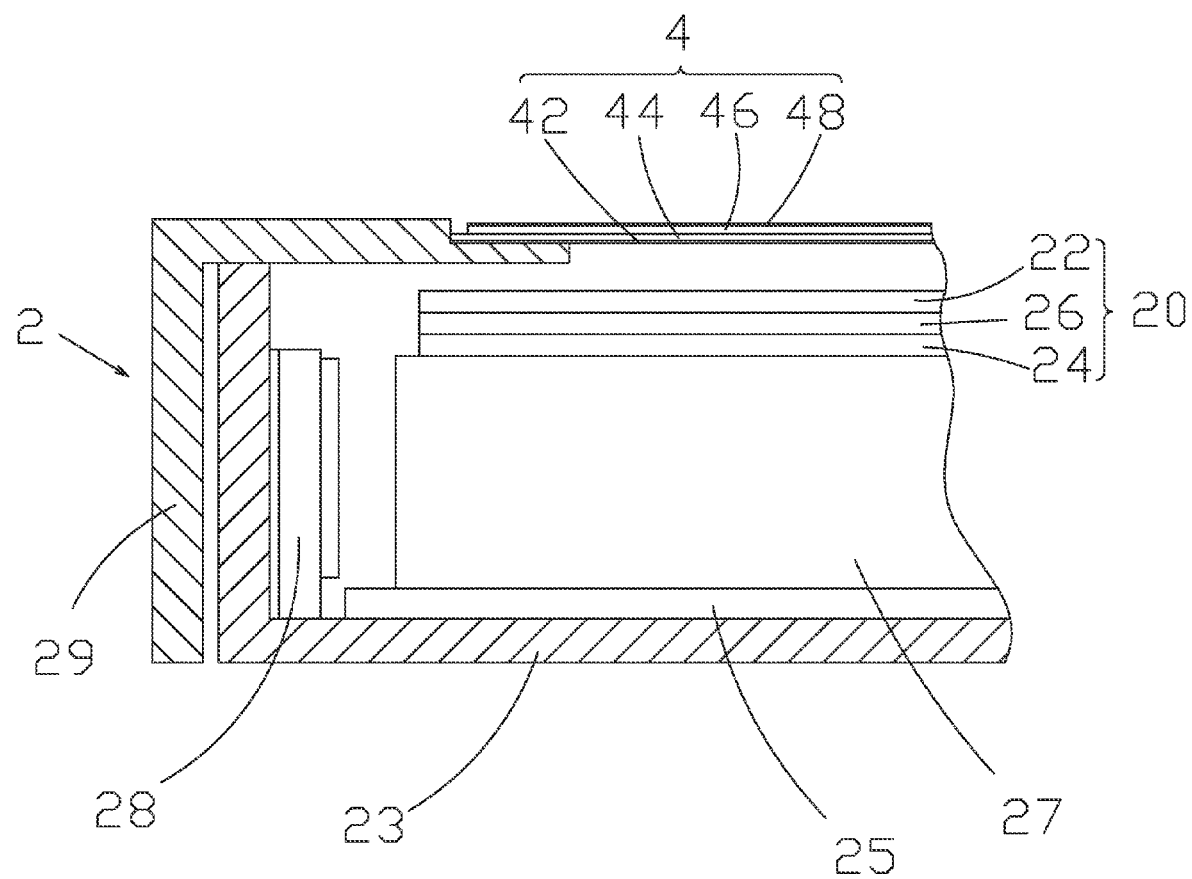
FIG. 1 is a schematic view showing the structure of a liquid crystal display device according to the present invention.
Figure 2:
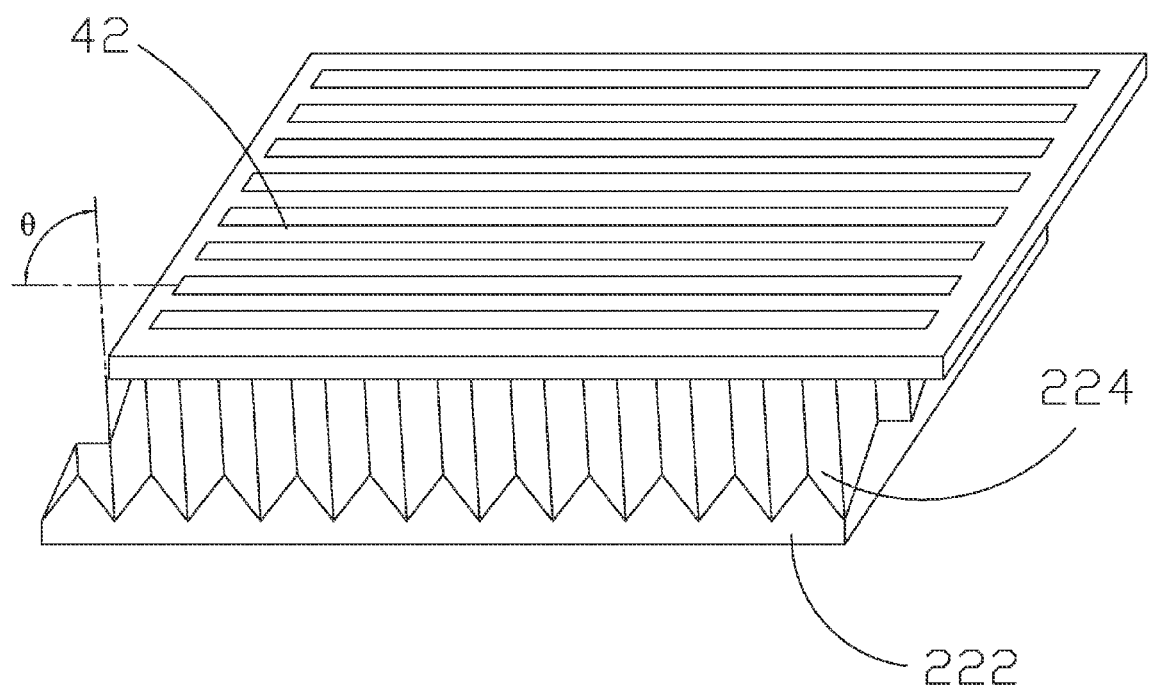
FIG. 2 is an exploded view showing a first prism plate and a first polarization plate of the liquid crystal display device according to the present invention.

Referring to FIGS. 1 and 2, the present invention provides a liquid crystal display device, which comprises a backlight module 2 and a liquid crystal panel 4 disposed on the backlight module 2. The backlight module 2 comprises an optic film assembly 20. The optic film assembly 20 comprises a first prism plate 22. The liquid crystal panel 4 comprises a first polarization plate 42 and the first polarization plate 42 is arranged to directly confront the first prism plate 22. The first prism plate 22 comprises a first base plate 222 and a plurality of parallel first prism bars 224 formed on an upper surface of the first base plate 222. The first prism bars 224 have an axial direction that forms an included angle θ with respect to a polarization direction of the first polarization plate 42. The included angle θ is in the range of 50°-90°, and is preferably 60°.

Figure 3:
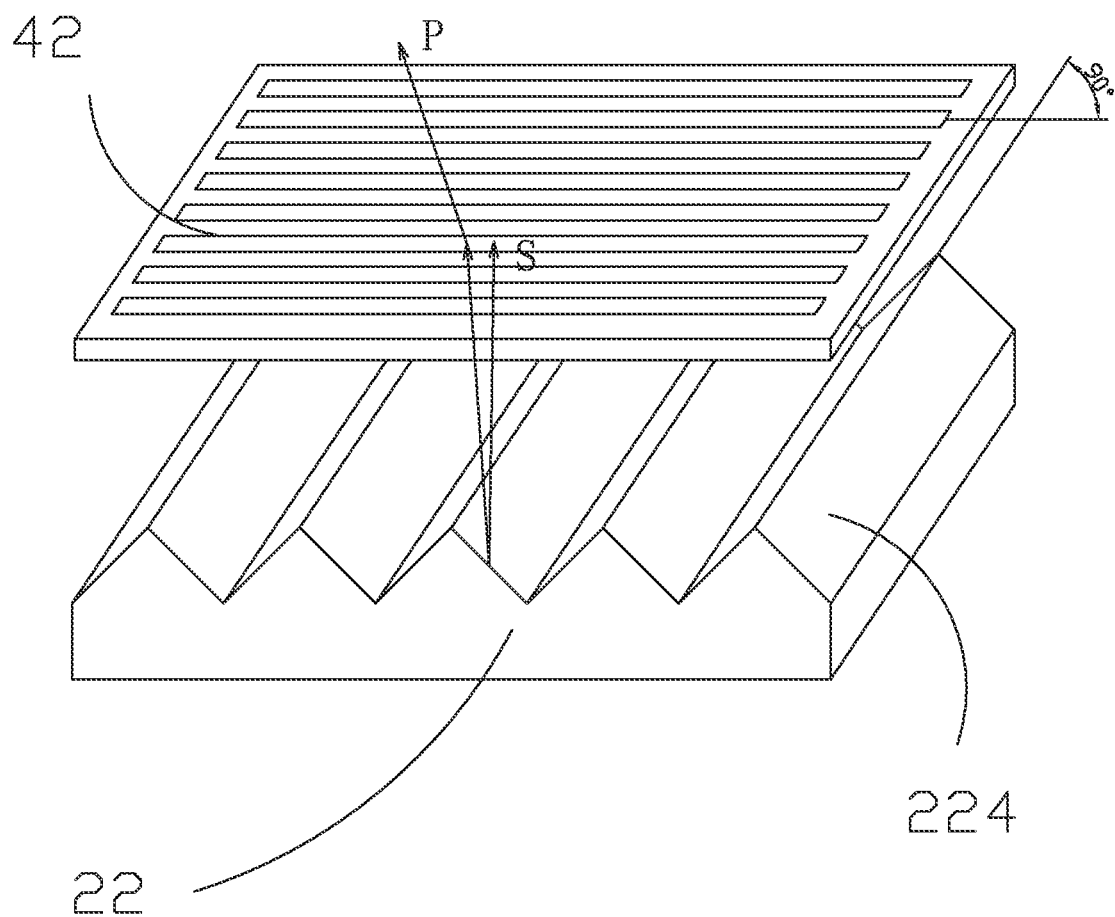
FIG. 3 is a diagram showing an optic path of light transmitting through the first prism plate and the first polarization plate.

As shown in FIG. 3, since light wave is a transverse wave, of which the vibration direction of light wave is perpendicular to the propagation direction thereof. By splitting light into a P component of which the vibration direction is on a plane defined by incident light and a normal direction and an S component of which the vibration direction is perpendicular to the plane defined by the incident light and the normal direction, the P component is consistent with the polarization direction of the first polarization plate 42 and is thus allowed to transmit through the first polarization plate 42 and the S component is perpendicular to the polarization direction of the first polarization plate 42 and is thus absorbed by the first polarization plate 42 and prohibited from transmitting through the first polarization plate 42. Light that transmits through a lower surface of the first prism plate 22 to enter the first prism plate 22 is refracted when emitting from an upper surface of the first prism plate 22. Since the P component and the S component of the light are at different incident angles, the reflectivity and refractivity are both different. In case that the first prism bars 224 of the first prism plate 22 show an axial direction that is perpendicular to the polarization direction of the first polarization plate 42, when the light is refracted by the upper surface of the first prism plate 22, the P component of the light is easier to refract than the S component and thus partial light polarization occurs. The P component is consistent with the polarization direction of the first polarization plate 42 and is allowed to transmit through the first polarization plate 42, making the transmittance of the first polarization plate 42 maximum and the luminance of the liquid crystal panel greatest.

Based on the above principle, various structures of the optic film assembly have been tested for influence on the light transmittance of the first polarization plate. The results are listed in the following table:

| sequence number | structure of optic film assembly | light transmittance | difference in luminance (%) |
|---|---|---|---|
| 1 | DF + Prism(0) + DF | 100.0% | |
| 2 | DF + Prism(0) | 110.9% | 104.3% |
| 3 | DF + Prism(90) | 115.7% | |
| 4 | DF + LTC(0) | 102.1% | 107.3% |
| 5 | DF + LTC(90) | 109.5% | |
| 6 | DF + Prism(90) + LTC(0) | 128.5% | 106.2% |
| 7 | DF + Prism(0) + LTC(90) | 136.5% | |
| 8 | DF + Prism(90) + Prism(0) | 145.5% | 104.6% |
| 9 | DF + Prism(0) + Prism(90) | 152.2% | | in which DF stands for diffusion plate, Prism(0) indicates a sharp-corner prism plate (prisms of the prism plate having an apex that is of a sharp corner) and included angle between axial direction of prisms of the sharp-corner prism plate and polarization direction of polarization plate, and LTC(0) indicates a rounded-corner prism plate (prisms of the prism plate having an apex that is of a rounded corner) and included angle between an axial direction of prisms of the rounded-corner prism plate and the polarization direction of the polarization plate.

Detailed explanation of the table is as follows:

Structure 1: The optic film assembly comprises, sequentially from bottom to top, a first diffusion plate, a sharp-corner first prism plate disposed on the first diffusion plate, and a second diffusion plate disposed on the sharp-corner prism plate. The sharp-corner prism plate has first prism bars that have an axial direction perpendicular to the polarization direction of the first polarization plate. The light transmittance of the first polarization plate of this Structure is set 100% to serve as a reference for comparison.

Structure 2: The optic film assembly comprises, sequentially from bottom to top, a first diffusion plate and a sharp-corner first prism plate disposed on the first diffusion plate. The first prism plate has first prism bars that have an axial direction parallel to the polarization direction of the first polarization plate. The light transmittance of the first polarization plate of this Structure is 110.9%.

Structure 3: The optic film assembly comprises, sequentially from bottom to top, a first diffusion plate and a sharp-corner first prism plate disposed on the first diffusion plate. The first prism plate has first prism bars that have an axial direction perpendicular to the polarization direction of the first polarization plate. The light transmittance of the first polarization plate of this Structure is 115.7%, which is 104.3% of that of the light transmittance of Structure 2.

Structure 4: The optic film assembly comprises, sequentially from bottom to top, a first diffusion plate and a rounded-corner first prism plate disposed on the first diffusion plate. The first prism plate has first prism bars that have an axial direction parallel to the polarization direction of the first polarization plate. The light transmittance of the first polarization plate of this Structure is 102.1%.

Structure 5: The optic film assembly comprises, sequentially from bottom to top, a first diffusion plate and a rounded-corner first prism plate disposed on the first diffusion plate. The first prism plate has first prism bars that have an axial direction perpendicular to the polarization direction of the first polarization plate. The light transmittance of the first polarization plate of this Structure is 109.5%, which is 107.3% of the light transmittance of Structure 4.

Structure 6: The optic film assembly comprises, sequentially from bottom to top, a first diffusion plate, a sharp-corner first prism plate disposed on the first diffusion plate, a rounded-corner second prism plate disposed on the sharp-corner first prism plate. The sharp-corner first prism plate has first prism bars that have an axial direction perpendicular to the polarization direction of the first polarization plate and the rounded-corner second prism plate has second prism bars that have an axial direction parallel to the polarization direction of the first polarization plate. The light transmittance of the first polarization plate of this Structure is 128.5%.

Structure 7: The optic film assembly comprises, sequentially from bottom to top, a first diffusion plate, a sharp-corner first prism plate disposed on the first diffusion plate, a rounded-corner second prism plate disposed on the sharp-corner first prism plate. The sharp-corner first prism plate has first prism bars that have an axial direction parallel to the polarization direction of the first polarization plate and the rounded-corner second prism plate has second prism bars that have an axial direction perpendicular to the polarization direction of the first polarization plate. The light transmittance of the first polarization plate of this Structure is 136.5%, which is 106.2% of the light transmittance of Structure 6.

Structure 8: The optic film assembly comprises, sequentially from bottom to top, a first diffusion plate, a sharp-corner first prism plate disposed on the first diffusion plate, a sharp-corner second prism plate disposed on the sharp-corner first prism plate. The sharp-corner first prism plate has first prism bars that have an axial direction perpendicular to the polarization direction of the first polarization plate and the sharp-corner second prism plate has second prism bars that have an axial direction parallel to the polarization direction of the first polarization plate. The light transmittance of the first polarization plate of this Structure is 145.5%.

Structure 9: The optic film assembly comprises, sequentially from bottom to top, a first diffusion plate, a sharp-corner first prism plate disposed on the first diffusion plate, a sharp-corner second prism plate disposed on the sharp-corner first prism plate. The sharp-corner first prism plate has first prism bars that have an axial direction parallel to the polarization direction of the first polarization plate and the sharp-corner second prism plate has second prism bars that have an axial direction perpendicular to the polarization direction of the first polarization plate. The light transmittance of the first polarization plate of this Structure is 152.2%, which is 104.6% the light transmittance of Structure 8.

Apparently, by adopting Structure 6, 7, 8, 9, the light transmittance of the first polarization plate is relatively high. Comparisons between Structure 6 and Structure 7 and between Structure 8 and Structure 9 show that when the axial direction of the first prism bars of the first prism plate is perpendicular to the first polarization plate the polarization direction, the first polarization plate shows the greatest light transmittance.

Figure 4:
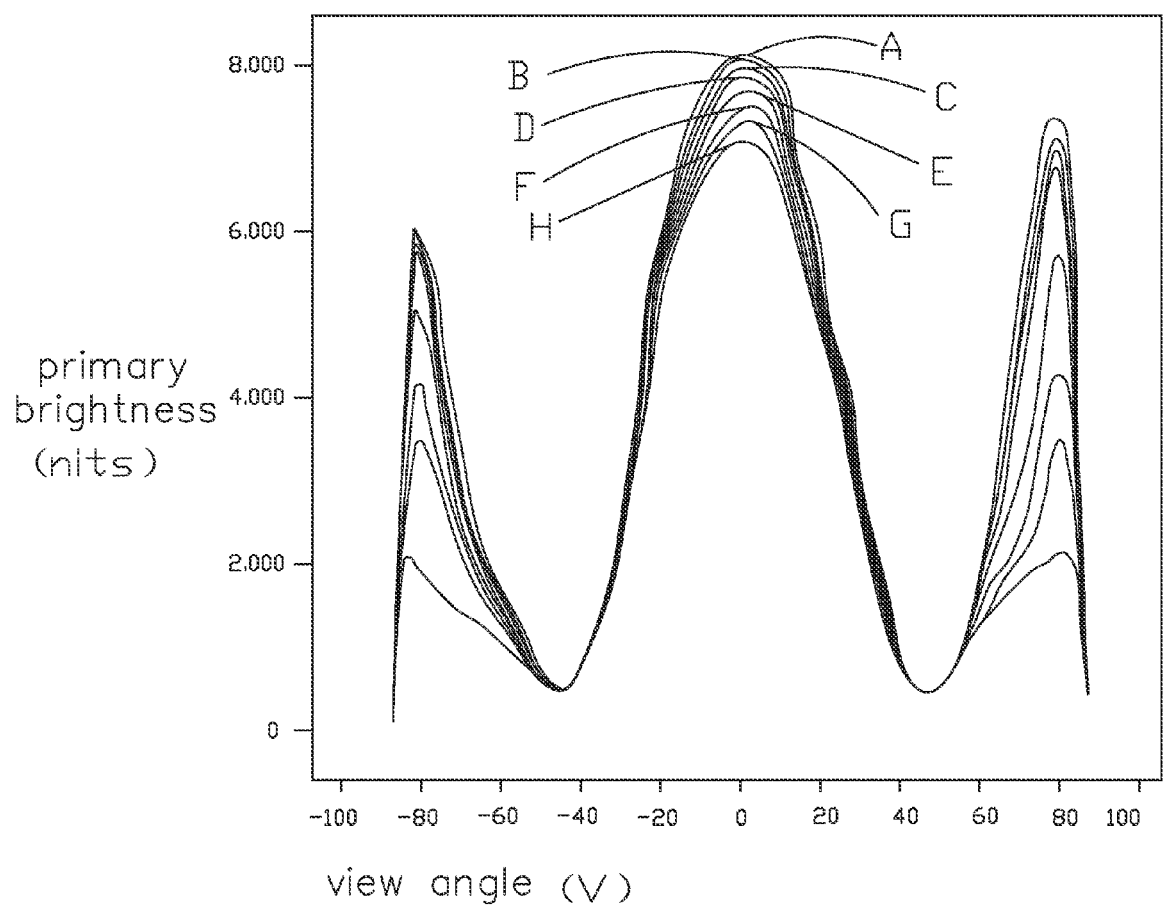
FIG. 4 is a plot showing view angle-brightness curves for various angles between axial direction of first prism bar of the first prism plate and polarization direction of the first polarization plate.

Further, regarding to the issue of non-homogenous brightness, the following test has been conducted. Referring to FIG. 4, under the condition that the axial direction of the first prism bars of the first prism plate is initially perpendicular to the polarization direction of the first polarization plate, the first prism plate is rotated and the curves indicated by A, B, C, D, E, F, G, and H respectively represent a luminance intensity curve for the first prism bars of the first prism plate being rotated by an angle of 0°, 5°, 10°, 15°, 20°, 25°, 30°, and 35°.

These curves show that with the first prism plate being rotated by an angle less than 40°, namely the included angle between the axial direction of the first prism bars of the first prism plate and the polarization direction of the first polarization plate being in the range of 50°-90°, it can simultaneously ensure the desired luminance and brightness homogeneity for the liquid crystal panel. And, when the first prism plate is rotated by an angle of 30°, namely the included angle between the axial direction of the first prism bars of the first prism plate and the polarization direction of the first polarization plate being 60°, an optimum result is obtained.

Referring to FIG. 2, the lower surface of the first base plate 222 of the first prism plate 22 is subjected to hazing treatment to form a hazed surface. The hazing treatment includes frosting, blasting or screen printing. The lower surface of the first base plate 222 is so hazed to show 10%-40% haze.

Figure 5:
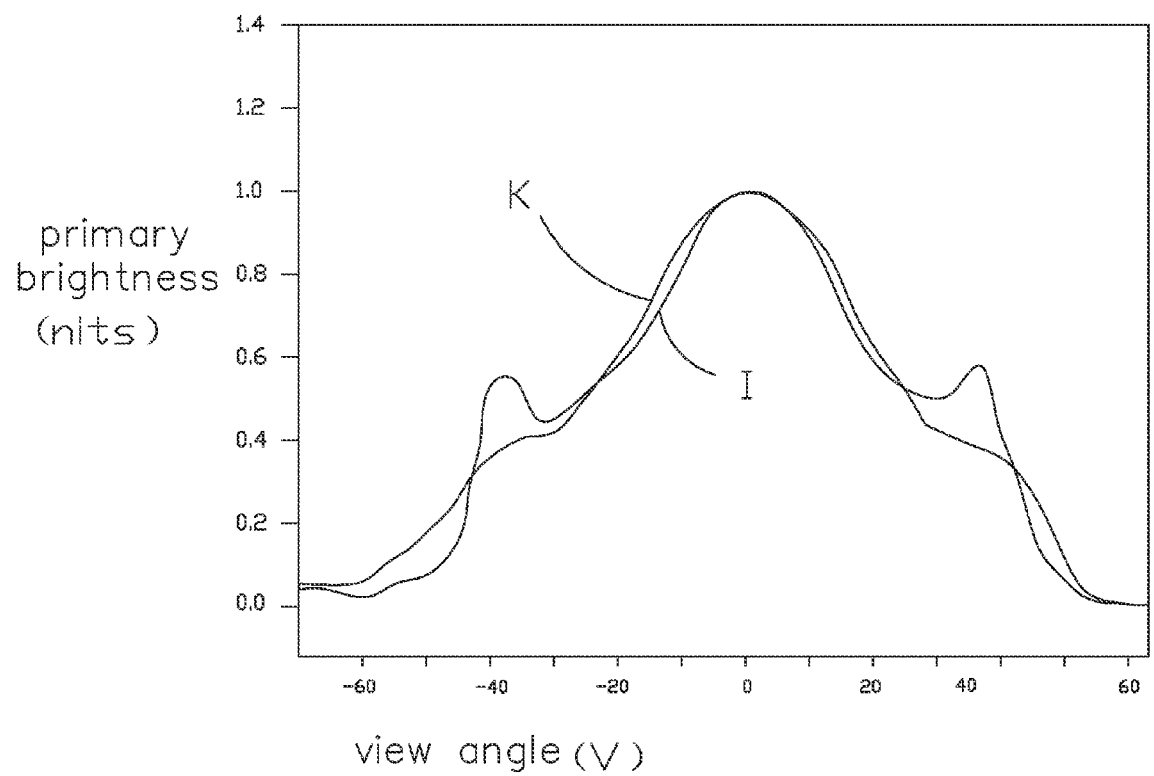
FIG. 5 is a plot showing view angle-brightness curves for backside haze of the first prism plate being respectively 4% and 30% under the condition that the included angle between the axial direction of the first prism bar of the first prism plate and the polarization direction of the first polarization plate is 60°.
Figure 6:
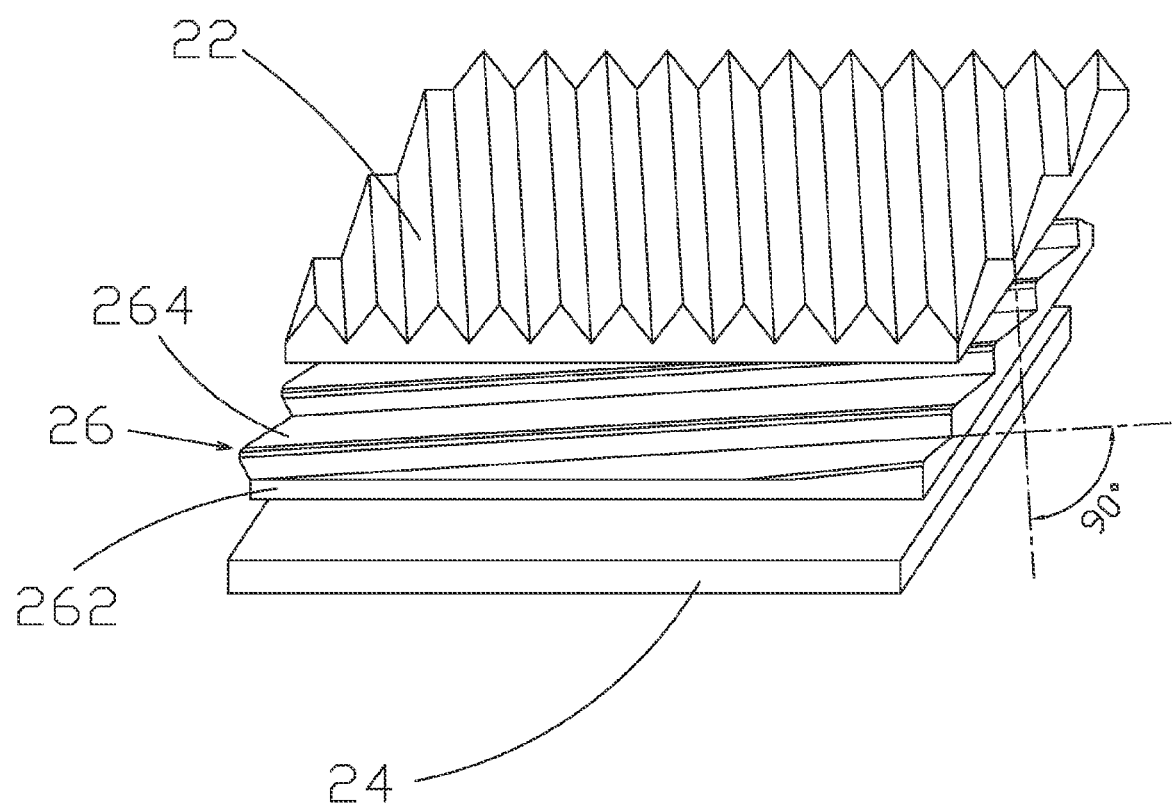
FIG. 6 is an exploded view of an embodiment of optic film assembly of the liquid crystal display device according to the present invention.

Also referring to FIG. 5, view angle-brightness curves are respectively given for included angle between the axial direction of the first prism bars of the first prism plate and the polarization direction of the first polarization plate being 60° and the backside haze of the first prism plate being 4% and 30%, in which curves indicated by K and I respectively represent view angle-brightness curves for haze of 30% and 4%. Experiments show that when the haze of the hazed surface is between 10%-40%, the homogeneity of brightness is better and haze of 30% gives the best result.

Referring to FIGS. 1, 2, and 5, which show an exploded view of an embodiment of the optic film assembly of the liquid crystal display device according to the present invention, in the instant embodiment, the optic film assembly 20 comprises a diffusion plate 24 disposed below the first prism plate 22, and a second prism plate 26 disposed between the first prism plate 22 and the diffusion plate 24. The second prism plate 26 comprises a second base plate 262 and a plurality of parallel second prism bars 264 formed on the second base plate 262. The second prism bars 264 have an axial direction that is perpendicular to the axial direction of the first prism bars 224 (included angle therebetween being 90°). The first prism bars 224 are triangular prisms, which are gradually tapered in an upward direction from the upper surface of the first base plate 222 whereby the first prism bars 224 have apexes that are each of a sharp corner. The second prism bars 264 are triangular prisms, which are gradually tapered in an upward direction from an upper surface of the second base plate 262 whereby the second prism bars 264 have apexes that are each of a rounded corner.

The above described structures of the optic film assembly 20 are just illustrative examples. It is alternatively possible to provide first and second prism plates 22, 26 that have first and second prism bars 224, 264 that are both sharp-corner triangular prisms or rounded-corner triangular prisms, or the first prism bars 224 of the first prism plate 22 are rounded-corner triangular prisms while the second prism bars 264 of the second prism plate 26 are sharp-corner triangular prisms. Or alternatively, only the first prism plate 22 is included and the first prism bars 224 of the first prism plate 22 can be rounded-corner or sharp-corner triangular prisms.

In summary, the present invention provides a liquid crystal display device, which omits the topmost diffusion plate of the known optic film assembly so as to lower the manufacture cost and also arranges the topmost, first prism plate of an optic film assembly and the bottommost first polarization plate of the liquid crystal panel in such a way to show an angle therebetween in order to increase the light transmittance of the liquid crystal display device, improve non-homogeneity of brightness and darkness displayed on the liquid crystal panel and also provides a coating on the surface of the first prism plate that is away from the first polarization plate to show predetermined haze for eliminating side lobe light shape of image and thus improving optical grade of a large-sized liquid crystal display device.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A liquid crystal display device, comprising a backlight module and a liquid crystal panel disposed on the backlight module, the backlight module comprising an optic film assembly, the optic film assembly comprising a first prism plate, the liquid crystal panel comprising a first polarization plate, the first polarization plate being arranged to directly confront the first prism plate, the first prism plate comprising a first base plate and a plurality of parallel first prism bars formed on an upper surface of the first base plate, the first prism bars having an axial direction that forms an included angle with respect to a polarization direction of the first polarization plate, which is 60 degrees.

2. The liquid crystal display device as claimed in claim 1, wherein the first base plate of the first prism plate has a lower surface that is subjected to hazing treatment to form a hazed surface.

3. The liquid crystal display device as claimed in claim 2, wherein the hazing treatment is frosting, blasting or screen printing.

4. The liquid crystal display device as claimed in claim 2, wherein the lower surface of the first base plate is so hazed to show 10%-40% haze.

5. The liquid crystal display device as claimed in claim 1, wherein the optic film assembly comprises a diffusion plate disposed below the first prism plate.

6. The liquid crystal display device as claimed in claim 5, wherein the optic film assembly comprises a second prism plate disposed between the first prism plate and the diffusion plate, the second prism plate comprising a second base plate and a plurality of parallel second prism bars formed on an upper surface of the second base plate, the second prism bars having an axial direction perpendicular to the axial direction of the first prism bars.

7. The liquid crystal display device as claimed in claim 6, wherein the first prism bars are triangular prisms, which are gradually tapered in an upward direction from the upper surface of the first base plate whereby the first prism bars have apexes that are each of a sharp corner and the second prism bars are triangular prisms, which are gradually tapered in an upward direction from an upper surface of the second base plate whereby the second prism bars have apexes that are each of a rounded corner.

8. The liquid crystal display device as claimed in claim 1, wherein the liquid crystal panel comprises a first glass substrate disposed on the first polarization plate, a second glass substrate disposed on the first glass substrate, liquid crystal arranged between the first glass substrate and the second glass substrate, and a second polarization plate disposed on the second glass substrate.

9. The liquid crystal display device as claimed in claim 1, wherein the backlight module comprises a backplane, a reflector plate arranged in the backplane, a light guide plate arranged on the reflector plate, a light source arranged inside the backplane, and a mold frame mounted to the backplane, the optic film assembly being disposed on the light guide plate, the liquid crystal panel being disposed on the mold frame.

10. A liquid crystal display device, comprising a backlight module and a liquid crystal panel disposed on the backlight module, the backlight module comprising an optic film assembly, the optic film assembly comprising a first prism plate, the liquid crystal panel comprising a first polarization plate, the first polarization plate being arranged to directly confront the first prism plate, the first prism plate comprising a first base plate and a plurality of parallel first prism bars formed on an upper surface of the first base plate, the first prism bars having an axial direction that forms an included angle with respect to a polarization direction of the first polarization plate;

wherein the included angle between axial direction of the first prism bars and the polarization direction of the first polarization plate is 60 degrees;

wherein the first base plate of the first prism plate has a lower surface that is subjected to hazing treatment to form a hazed surface;

wherein the hazing treatment is frosting, blasting or screen printing;

wherein the lower surface of the first base plate is so hazed to show 10%-40% haze;

wherein the optic film assembly comprises a diffusion plate disposed below the first prism plate;

wherein the optic film assembly comprises a second prism plate disposed between the first prism plate and the diffusion plate, the second prism plate comprising a second base plate and a plurality of parallel second prism bars formed on an upper surface of the second base plate, the second prism bars having an axial direction perpendicular to the axial direction of the first prism bars;

wherein the first prism bars are triangular prisms, which are gradually tapered in an upward direction from the upper surface of the first base plate whereby the first prism bars have apexes that are each of a sharp corner and the second prism bars are triangular prisms, which are gradually tapered in an upward direction from an upper surface of the second base plate whereby the second prism bars have apexes that are each of a rounded corner;

wherein the liquid crystal panel comprises a first glass substrate disposed on the first polarization plate, a second glass substrate disposed on the first glass substrate, liquid crystal arranged between the first glass substrate and the second glass substrate, and a second polarization plate disposed on the second glass substrate; and wherein the backlight module comprises a backplane, a reflector plate arranged in the backplane, a light guide plate arranged on the reflector plate, a light source arranged inside the backplane, and a mold frame mounted to the backplane, the optic film assembly being disposed on the light guide plate, the liquid crystal panel being disposed on the mold frame.

* * * * *